Jan. 5, 1926.
M. F. FITZGERALD
ELECTRIC GRILL
Filed August 13, 1925
1,568,593
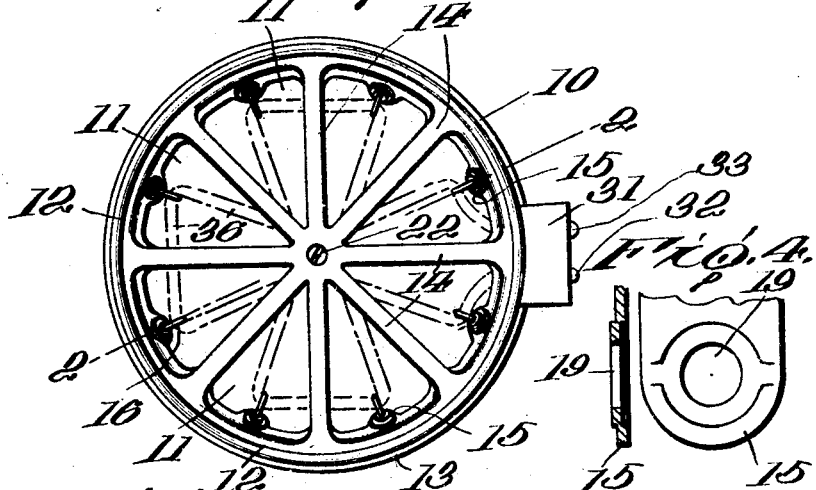
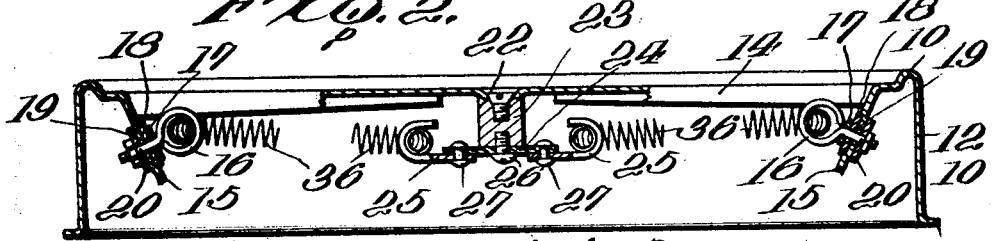
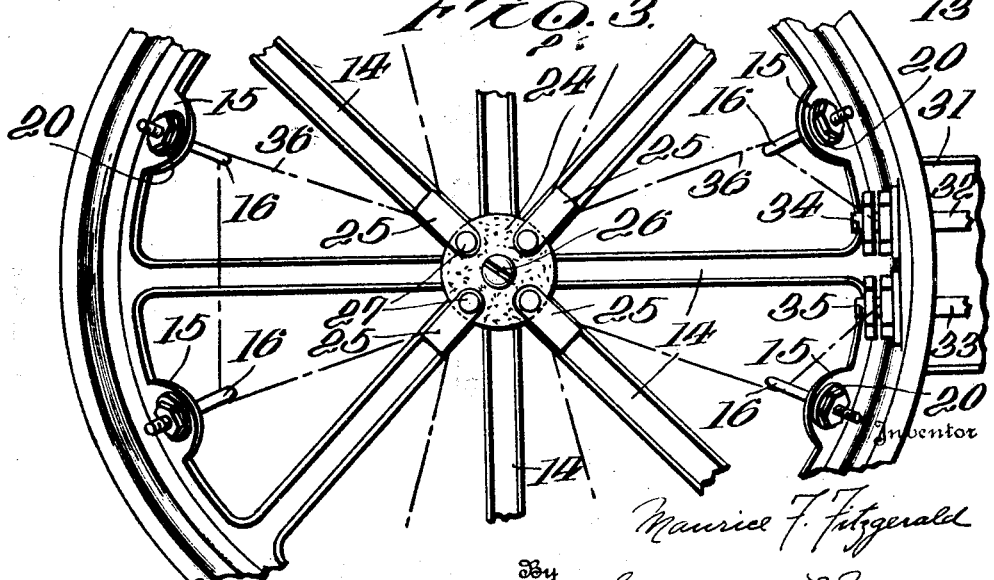

Patented Jan. 5, 1926.

1,568,593

UNITED STATES PATENT OFFICE.

MAURICE F. FITZGERALD, OF WINSTED, CONNECTICUT, ASSIGNOR TO THE FITZGERALD MANUFACTURING COMPANY, OF WINSTED, CONNECTICUT, A CORPORATION OF CONNECTICUT.

ELECTRIC GRILL.

Application filed August 13, 1925. Serial No. 50,018.

*To all whom it may concern:*

Be it known that I, MAURICE F. FITZGERALD, a citizen of the United States, residing at Winsted, in the county of Litchfield, State of Connecticut, have invented certain new and useful Improvements in Electric Grills, of which the following is a description, reference being had to the accompanying drawing, and to the figures of reference marked thereon.

This invention relates to improvements in the construction of electric grills, and more particularly to the method of supporting the heating element.

By this invention it is proposed to support the heating element in such a manner that a minimum of contact is present between the heating element and the frame members, to avoid losses of heat by conduction. Furthermore, the frame is of a design which is easily and cheaply constructed and assembled, and carries the heating element well insulated with regard to itself. Also, the design of the frame and the supporting arrangement of the heating element is such that the heating element is carried positively opposite the apertures of the top of the frame, so that the heat from the heating element passes directly and with a minimum of convection losses to the article disposed upon the top of the grill; and likewise the heating element has free outlet downward for radiant heat.

With these and other purposes in view, as will appear from the following specification and claims, there has been represented on the accompanying drawings, one form of execution for an electric grill constructed according to this invention, in which:

Fig. 1 is a plan of the top of the grill, showing the location of the heating element with respect to the same.

Fig. 2 is a section on line 2—2 of Fig. 1, on an enlarged scale.

Fig. 3 is a bottom view of the grill on the same scale as Fig. 2.

Fig. 4 details the method of forming the offset washer retaining portions of the device.

This grill has the top plate 10 which is formed of a single piece of metal, punched out to form the radial members 14 and the circumferential rim 12 which define the apertures 11 are bent downward all around, as shown in Fig. 2, with a longer portion or ear 15 at a point midway of the arcuate side of the aperture. This ear has a hole therein to receive an eye-bolt 16 which passes through a pressure washer 17, the mica washers 18, the metal of the portion 15, and the mica washers 19, and then has a locknut 20 to hold the eye-bolt in predetermined position. In order to hold these mica washers 18 in position so that the eye-bolt is maintained out of contact with the frame, the metal of the latter is punched and pushed out of plane with the rest of the portion 15 for a diameter corresponding to that of the washers 18: the form of the incisions for this purpose are indicated at 21 in Fig. 4.

A hole in the center of the top plate 10 has a depressed rim to receive and maintain the countersunk head of a screw 22, which is threaded into a spacing element 23 on the bottom of this top plate, as shown in Fig. 2. A disk 24 of insulating material such as mica serves as a carrier for the holding clips 25 for the heating element, and is secured to the spacing element 23 by the screw 26. The holding clips 25 have upwardly curled outer ends to serve as hooks for the heating element, and are attached to the disk 24 by the rivets 27.

At one point of the periphery of the cylindrical portion 12 of the plate 10 is secured the shield 31 to protect the terminals 32, 33, which comprise bolts held in and insulated from the frame 10 in any suitable manner, and having the nuts 34, 35 on the inner end thereof to secure the ends of the heating element.

The heating element 36 is a continuous coil of resistance wire fastened to one of these terminal bolt 32, and is led in zigzag fashion from center to rim of the top plate, passing alternately from the hook of a holding clip 25 to an eye-bolt 16, and back and forth to the next holding clip until the other terminal 33 is reached. By the design of the parts, it will be seen from Fig. 1, that the greater part of the heating element is free and out of vertical alinement with any part of the top plate, and from Fig. 2 it is apparent that there is no lower member to obstruct free radiation of the heat. On the other hand, the only parts in contact with the heating element 36 are the holding clips 25 and the eye-bolts 16; the former of which are carried by the washer disk 24, and hence substantially heat-insulated from the frame, and the latter being of small conductive area, and likewise carried so as to afford little opportunity for heat conduction.

Obviously, many changes may be made in the form of execution without departing from the scope of the appended claims.

Having thus described my invention, what I claim is:

1. In an electric grill, a top plate having radial members and a circumferential rim defining sector-shaped apertures, the arcuate portion of the rim between two of the radial members being curled downwardly to form an ear, an eye-bolt supported upon such ear and insulated from the frame, an insulating disk carried beneath the center of the top plate and insulated therefrom, holding clips carried by said disk, terminals insulated from said plate and carried thereby, and a heating element lead in zig-zag fashion from one terminal to the other and passing alternately over the holding clips and the eyebolts.

2. In an electric grill, a plate having an aperture in the top, an ear on said plate and projecting from the edge of the aperture, an attaching member carried by said ear and insulated from the plate, and a heating element supported intermediate its length by said attaching member.

3. In an electric grill, a top plate, an insulating disk carried beneath the center of and by the plate, holding clips carried by the disk, and a heating element supported by said clips.

4. In an electric grill, a top plate having radial members and a circumferential rim defining sector-shaped apertures, the edge of the rim being bent down at the middle of the arcuate edge of such apertures to provide downwardly and inwardly extending ears, attaching members carried by and insulated from said ears, an insulating disk carried by and in spaced relation to said top plate beneath the center thereof, holding clips attached to said insulating disk, and a heating element passing in zigzag fashion alternately from a central holding clip to a circumferential attaching member and back, and terminal members attached to and insulated from said plate to retain the ends of the heating element and conduct current thereto.

In testimony whereof, I affix my signature.

MAURICE F. FITZGERALD.